United States Patent
Kuroda (10) Patent No.: US 10,234,751 B2
(45) Date of Patent: Mar. 19, 2019

(54) PROJECTOR, AND IMAGE DETERIORATION PREVENTION METHOD

(71) Applicant: FUJIFILM Corporation, Tokyo (JP)

(72) Inventor: Yasuto Kuroda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/923,803

(22) Filed: Mar. 16, 2018

(65) Prior Publication Data

US 2018/0203336 A1    Jul. 19, 2018

Related U.S. Application Data

(63) Continuation of application No. PCT/JP2016/076638, filed on Sep. 9, 2016.

(30) Foreign Application Priority Data

Sep. 17, 2015  (JP) ................. 2015-183859

(51) Int. Cl.
    *G03B 21/14*  (2006.01)
    *G03B 21/16*  (2006.01)
    (Continued)

(52) U.S. Cl.
    CPC ............ *G03B 21/16* (2013.01); *G02B 13/16* (2013.01); *G03B 21/00* (2013.01); *G03B 21/14* (2013.01);
    (Continued)

(58) Field of Classification Search
    CPC ................ G02B 5/20; F21V 9/04; F21V 9/06
    See application file for complete search history.

(56) References Cited

U.S. PATENT DOCUMENTS

2007/0046905 A1    3/2007  Takeuchi et al.
2008/0266527 A1*   10/2008 Fuse ................... G03B 5/04
                                                 353/38
(Continued)

FOREIGN PATENT DOCUMENTS

JP       2005-4227 A    1/2005
JP    2005-128217 A    5/2005
(Continued)

OTHER PUBLICATIONS

International Preliminary Report on Patentability and Written Opinion of the International Searching Authority (Forms PCT/IB/326, PCT/IB/373, PCT/ISA/237) for International Application No. PCT/JP2016/076638, dated Mar. 29, 2018, with English translation.

(Continued)

*Primary Examiner* — Cara Rakowski
*Assistant Examiner* — Danell L Owens
(74) *Attorney, Agent, or Firm* — Birch, Stewart, Kolasch & Birch, LLP (57) ABSTRACT

Within a lens-tube main body, the light-shielding member is fixed to a second lens frame in a second portion opposite to a first portion in which an image forming panel is shifted from an optical axis with the optical axis positioned therebetween. Since the light-shielding member is fixed to the second lens frame in the second portion, heat caused by the unnecessary light is distributed from the first portion to the second portion within the light-shielding member. Accordingly, a local temperature rise is suppressed, and deformation of a lens-tube main body is suppressed. Accordingly, tilt of lenses due to deformation of the lenses does not occur, and deterioration in resolution of the entire image caused by the tilt of the lenses or the occurrence of focus position shift in a diagonal direction due to the occurrence of field curvature is suppressed.

17 Claims, 10 Drawing Sheets

(51) Int. Cl.
  *G03B 21/00* (2006.01)
  *H04N 5/74* (2006.01)
  *G02B 13/16* (2006.01)
  *G03B 21/20* (2006.01)
  *G02B 5/00* (2006.01)
(52) U.S. Cl.
  CPC ............... *H04N 5/74* (2013.01); *G02B 5/005* (2013.01); *G03B 21/2013* (2013.01); *G03B 21/2033* (2013.01)

(56) References Cited

U.S. PATENT DOCUMENTS

| | | |
|---|---|---|
| 2010/0141937 A1 | 6/2010 | Ryu et al. |
| 2013/0070333 A1 | 3/2013 | Takahashi et al. |
| 2016/0018722 A1* | 1/2016 | Enokishima ......... G03B 21/145 353/30 |

FOREIGN PATENT DOCUMENTS

| | | |
|---|---|---|
| JP | 2007-3750 A | 1/2007 |
| JP | 2007-57656 A | 3/2007 |
| JP | 2010-120296 A | 6/2010 |
| JP | 2013-61604 A | 4/2013 |
| JP | 2014-10273 A | 1/2014 |
| JP | 2014-59333 A | 4/2014 |

OTHER PUBLICATIONS

International Search Report for International Application No. PCT/JP2016/076638, dated Nov. 29, 2016, with English translation.

\* cited by examiner

PROJECTOR, AND IMAGE DETERIORATION PREVENTION METHOD

CROSS-REFERENCE TO RELATED APPLICATIONS

This application is a Continuation of PCT International Application No. PCT/JP2016/076638 filed on 9 Sep. 2016, which claims priority under 35 U.S.C § 119(a) to Japanese Patent Application No. 2015-183859 filed on 17 Sep. 2015. The above application is hereby expressly incorporated by reference, in its entirety, into the present application.

BACKGROUND OF THE INVENTION

1. Field of the Invention

The present invention relates to a projector and an image deterioration prevention method, and particularly, to a projector in which an image forming panel is fixed so as to be shifted and an image deterioration prevention method thereof.

2. Description of the Related Art

A projector assigns an image corresponding to image information to light emitted from a light source by an image forming panel, projects the light on a screen with a projection lens, and displays the image. For example, a liquid crystal display (LCD) or a digital micromirror device (DMD) is used as the image forming panel. In the projector, in order to improve the quality of a projection image, a stop or a light-shielding member is disposed at an illumination optical system or a projection lens, and light rays that do not contribute to the forming of the image are removed.

In recent projectors, various image forming panels such as LCD or DMD or light sources are improved, and thus, the illuminance of the projected image is higher than that in the related art. Thus, for example, in a case where the light-shielding member for removing unnecessary light rays is disposed near the light source, a temperature of the light-shielding member remarkably increases. As a result, a temperature of a lens tube that holds the light-shielding member is higher than that in the related art. Thus, a temperature rise caused by the emission of the light rays to the light-shielding member is suppressed by forming a reflection region in the light-shielding member or disposing a metal plate as a heat-shielding member (see, for example, JP2005-128217A). In a lens tube of a projection optical system including a member made from resin, an unnecessary light-absorbing member is provided in the lens tube in order to prevent a member that holds an optical element from being deformed by heat (see, for example, JP2014-59333A).

SUMMARY OF THE INVENTION

In the lens tube of the projection lens described in JP2005-128217A and JP2014-59333A, the temperature rise of the lens tube is suppressed by forming the reflection region in the stop or disposing the metal plate as the heat-shielding member or the unnecessary light-absorbing member, but it is necessary to further control the temperature rise in a state in which the illuminance of the projection image is higher than that in the related art. Particularly, in a case where a wide-angle short-range projection type projector in which a center of the image forming panel is offset from an optical axis of the projection lens is used, since the bias of temperature within the lens tube is large, the projection lens is remarkably influenced by the temperature. Accordingly, it is necessary to further control the temperature rise.

An object of the present invention is to provide a projector and an image deterioration prevention method capable of efficiently suppressing a temperature rise with a simple configuration.

In order to achieve the object, a projector of the present invention comprises a projection lens, an image forming panel, a light source, and a light-shielding member. The projection lens includes a lens and a lens tube which holds the lens. The image forming panel is disposed such that a center of the image forming panel is shifted from an optical axis of the projection lens. The image forming panel forms an image. The light source irradiates the image forming panel with light, and projects the image on a projection surface with the projection lens. The light-shielding member has an opening through which the optical axis passes, and cuts light unnecessary in the projection in an edge portion of the opening. The light-shielding member is attached so as to be fixed to the lens tube in a second portion opposite to a first portion to which the image forming panel is shifted from the optical axis with the optical axis positioned therebetween so as to hold a gap between the lens tube and the light-shielding member in the first portion.

It is preferable that the lens tube has a light-shielding-member attachment surface perpendicular to the optical axis, the light-shielding member has a lens-tube attachment surface to be attached to the light-shielding-member attachment surface, and the light-shielding member is attached to the lens tube between the light-shielding-member attachment surface and the lens-tube attachment surface through a spacer having a thickness in the optical axis direction.

It is preferable that the lens tube has a light-shielding-member attachment surface perpendicular to the optical axis, the light-shielding member has a lens-tube attachment surface to be attached to the light-shielding-member attachment surface, and at least one of the light-shielding-member attachment surface or the lens-tube attachment surface includes a spacer that protrudes in the optical axis direction, and the light-shielding member is attached to the lens tube through the spacer. As stated above, the spacer according to the present invention forms a gap between the light-shielding member and the lens tube. The light-shielding member and the lens tube are separately formed or the light-shielding member and the lens tube are integrally formed.

It is preferable that the light-shielding member includes an attachment piece that extends in the optical axis direction from an edge of the light-shielding member, and a gap is formed in the optical axis direction between the light-shielding member and the lens tube through the attachment piece.

It is preferable that the second portion is in a region range of 180±90° with a shift direction of the image forming panel as a reference line in a state in which the lens tube is viewed in the optical axis direction. It is preferable that the lens tube includes a cylindrical lens-tube main body, and a lens frame that is disposed within the lens-tube main body and holds the lens, and the light-shielding-member attachment surface is an end surface of the lens frame facing the light-shielding member. It is preferable that the lens tube includes a cylindrical lens-tube main body, and a protrusion edge portion that protrudes inwards from an inner circumferential surface of the lens-tube main body, and the light-shielding-member attachment surface is an end surface of the protrusion edge portion facing the light-shielding member. It is preferable that the projector further comprises an insulation member that is disposed in the gap.

It is preferable that in a case where a distance from the optical axis to a center of the image forming panel is Y, a length of the image forming panel in a shift direction of the image forming panel is H, and a shift ratio of the image forming panel acquired by dividing the distance Y by the length H is S=Y/H, the shift ratio S is in a range of 0.4<S<0.7.

In an image deterioration prevention method of a projector according to the present invention, an image forming panel is disposed such that a center of the image forming panel is shifted from an optical axis of a projection lens, light is emitted from a light source to the image forming panel, and an image of the image forming panel is projected onto a projection surface with the projection lens. A light-shielding member is disposed in a lens tube which holds the projection lens. The light-shielding member has an opening through which the optical axis passes, and cuts light unnecessary in the projection in an edge portion of the opening. The light-shielding member is fixed in a second portion opposite to a first portion of the lens tube to which the image forming panel is shifted from the optical axis with the optical axis positioned therebetween, and holds a gap in the optical axis direction between the light-shielding member and the lens tube in the first portion.

According to the present invention, it is possible to provide a projector and an image deterioration prevention method capable of efficiently suppressing a temperature rise of a lens tube with a simple configuration.

DESCRIPTION OF THE PREFERRED EMBODIMENTS

First Embodiment

Figure 1:
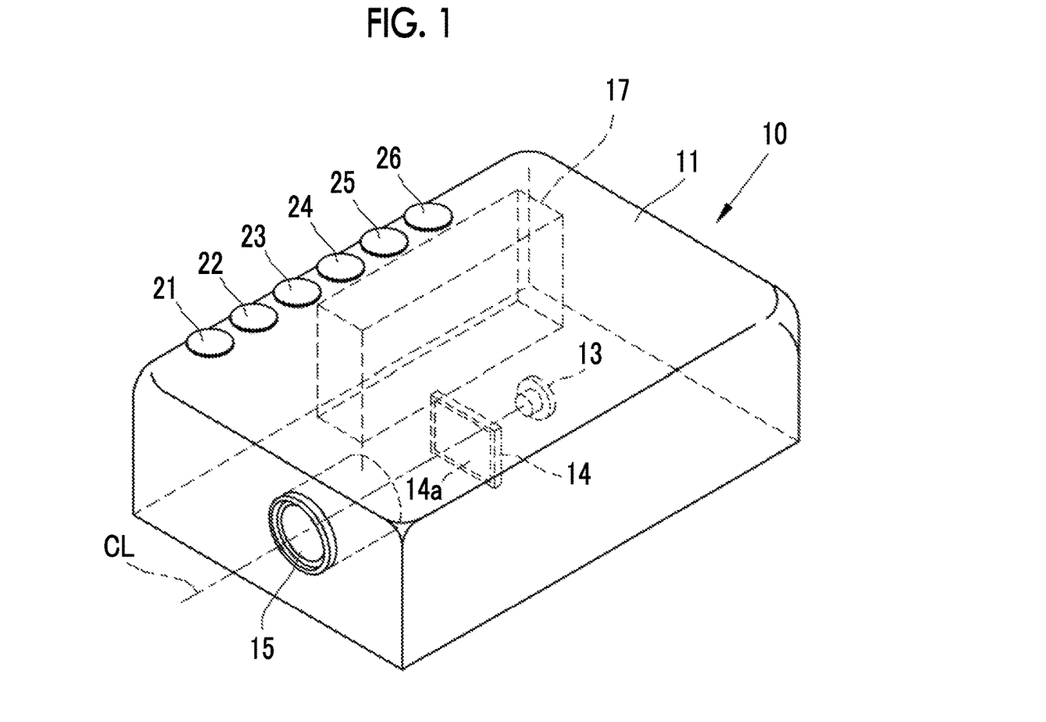
FIG. 1 is a perspective view showing a schematic configuration of a projector according to the present invention.

As shown in FIG. 1, a projector 10 according to the present embodiment is configured to accommodate a light source 13, an image forming panel 14, a projection lens 15, and a control unit 17 in a substantially cuboid case 11. A zoom dial 21, a light amount adjustment dial 22, a focus dial 23, a vertical pin adjustment dial 24, a horizontal pin adjustment dial 25, and a screen correction dial 26 are provided on a top surface of the case 11. Light rays emitted from the light source 13 are formed an image on an image forming surface 14a, are emitted from the projection lens 15, and are projected onto a screen (not shown in FIG. 1 and is denoted as a reference 20 in FIG. 3).

Figure 2:
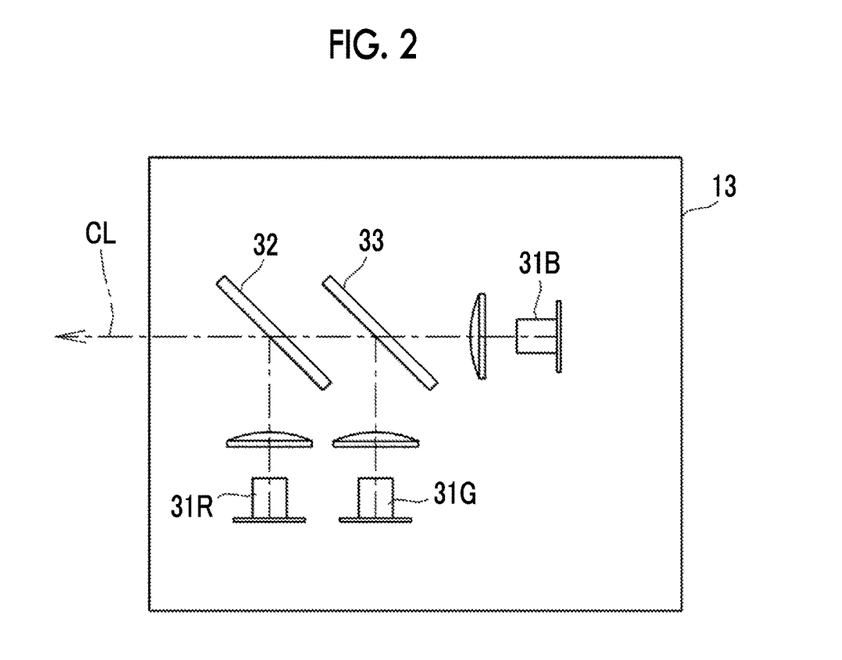
FIG. 2 is a schematic diagram showing a light source.

As shown in FIG. 2, the light source 13 includes light emitting diodes (LEDs) 31R, 31G, and 31B that emit light rays of three RGB colors, respectively. Light rays emitted by the R (red) LED 31R are reflected by a dichroic mirror 32. Light rays emitted by the G (green) LED 31G are reflected by a dichroic mirror 33, and are transmitted through the dichroic mirror 32. Light rays emitted by the B (blue) LED 31B are transmitted through the dichroic mirrors 32 and 33, and the light rays of the three RGB colors are emitted onto the same optical axis.

Referring back to FIG. 1, the control unit 17 displays an image of the three RGB colors on the image forming surface 14a. The control unit 17 also performs the following processes. For example, in a case where an operation signal of the zoom dial 21 is received, a size of the image projected onto the screen 20 is adjusted. In a case where an operation signal of the light amount adjustment dial 22 is received, the brightness of the image projected onto the screen 20 is adjusted. In a case where an operation signal of the focus dial 23 is received, a focus adjustment mechanism (not shown) of the projection lens 15 is operated, and the focus of the central portion of the image projected onto the screen 20 is adjusted. In a case where an operation signal of the vertical pin adjustment dial 24 is received, a first motor of a posture adjustment device (not shown) is rotated. Accordingly, the projection lens 15 is rotated with a horizontal axis perpendicular to an optical axis CL as its center, and a tilt of the projection lens 15 in an upper-lower direction is adjusted. In a case where an operation signal of the horizontal pin adjustment dial 25 is received, a second motor of the posture adjustment device is rotated. Accordingly, the projection lens 15 is rotated with a vertical axis perpendicular to the optical axis CL as its center, and a tilt of the projection lens 15 in a left-right direction is adjusted. In a case where an operation signal of the screen correction dial 26 is received, a display size and a shape of the image formed on the image forming surface 14a of the image forming panel 14 are changed. For example, the display size and shape are changed such that a rectangular image is not displayed as a trapezoid image depending on a tilt angle of the projection lens 15.

A transmissive type liquid crystal panel is used as the image forming panel 14. The light source 13 is disposed so as to face a rear surface of the image forming panel 14, that is, on a side opposite to the projection lens 15 with the image forming panel 14 as its reference, and use the LEDs 31R, 31G, 31B that simultaneously emit the three RGB colors. Instead of the LEDs 31R, 31G, and 31B, a xenon lamp that emits white light, a halogen lamp, and a ultra-high pressure mercury lamp may be used.

Figure 3:
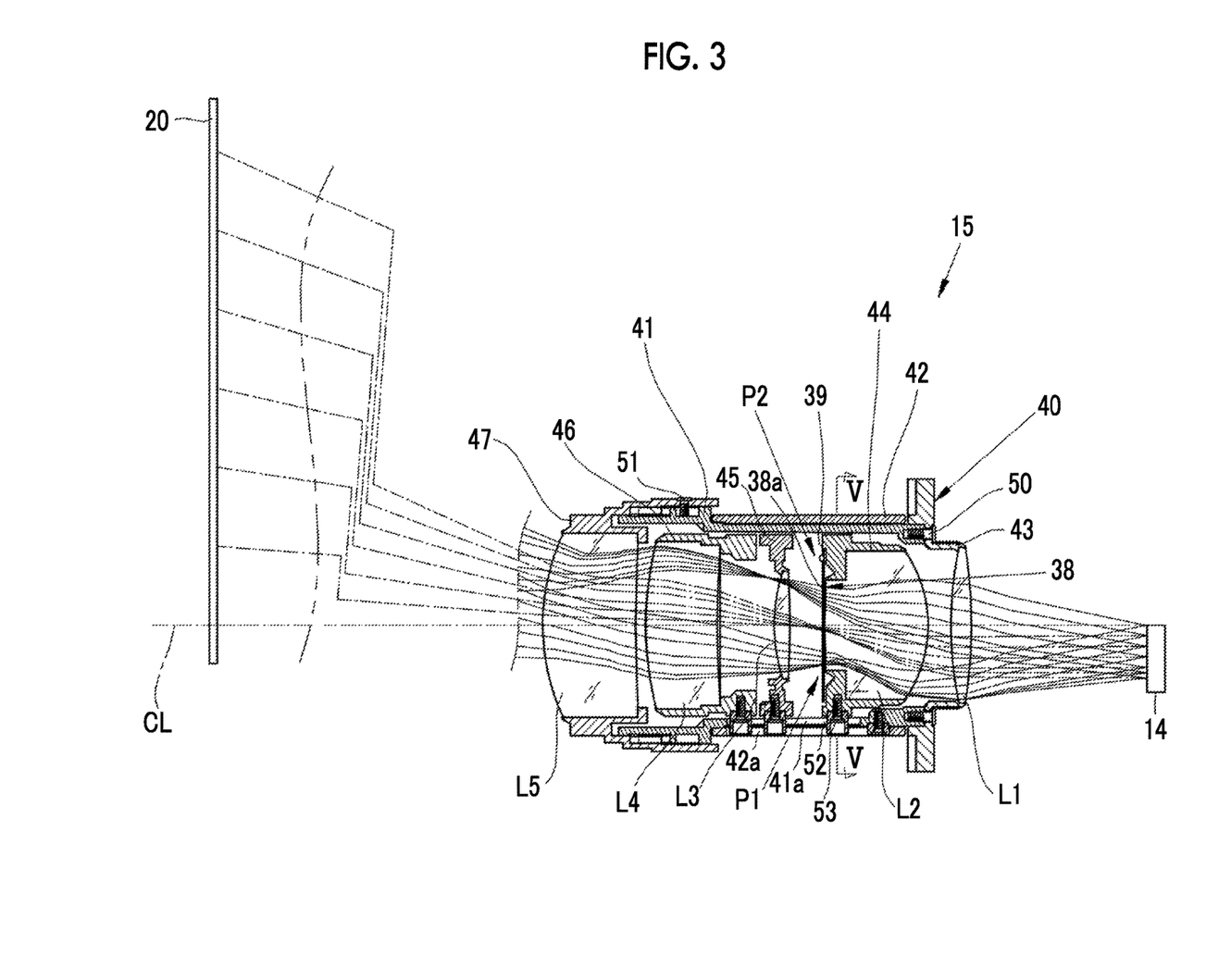
FIG. 3 is a longitudinal cross-sectional view showing a projection lens.

As shown in FIG. 3, the image is projected onto the screen 20 on an upper side of the optical axis CL of the projection lens 15. A center of the image forming panel 14 is fixed in a position which is shifted downwards from the optical axis CL of the projection lens 15 in a direction opposite to a direction in which a center position of a projected image (a projection surface of the screen 20) is shifted from the optical axis CL of the projection lens 15, that is, in a direction perpendicular to the optical axis CL.

Figure 4:
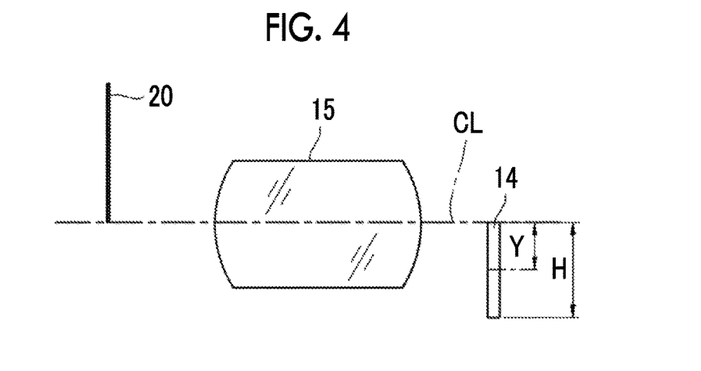
FIG. 4 is a schematic diagram for describing a shift ratio of an image forming panel.

A shift ratio of the image forming panel 14 will be described with reference to a schematic diagram of FIG. 4. In a case where a distance from the optical axis CL of the projection lens 15 to the center of the image forming panel 14 is Y and a length of the image forming panel 14 in a shift direction is H, a shift ratio S at which the image forming panel 14 is shifted is defined by S=Y/H. That is, in a case where S=0.5, an upper end surface of the image forming panel 14 matches the optical axis CL of the projection lens 15, as shown in FIG. 4. In a case where S>0.5 (S is larger than 0.5), the upper end surface of the image forming panel 14 is shifted to a direction in which the upper end surface is separated from the optical axis CL of the projection lens 15. In a case where S=0, the center of the image forming panel 14 matches the optical axis CL of the projection lens 15, and the arrangement close to a long-range projection type of the related art is achieved.

It is preferable that the shift ratio S at which the image forming panel 14 is shifted is larger than 0.4 and is smaller than 0.7. In a case where the shift ratio S is larger than 0.4, since the influence of a temperature on the projection lens 15 in the vertical direction is more remarkable than that in a case where the shift ratio is equal to or less than 0.4, a heat distribution reduction effect due to a light-shielding member 38 of the present invention can be acquired. Meanwhile, the shift ratio S is smaller than 0.7, and thus, the amount with which the image forming panel 14 is shifted is suppressed in an appropriate range. Thus, it is possible to appropriately suppress an increase in the number of lenses or an increase in size of the projection lens 15 due to an increase in projection amount other than the influence of a temperature distribution in a radial direction. Accordingly, an increase in size of a projector, deterioration in manufacturing suitability, or an increase in cost is prevented while the temperature distribution in the radial direction is prevented. As stated above, the shift ratio S of the image forming panel 14 falls within the above-described range, and thus, it is possible to provide high-performance product while reducing the influence of the temperature on the projection lens 15 in the vertical direction. It is more preferable that the shift ratio S of the image forming panel 14 is larger than 0.45 and is smaller than 0.6. In this case, the influence corresponding to the temperature of the projection lens 15 in the vertical direction is further reduced than that in a case where the shift ratio is larger than 0.4 and is smaller than 0.7, and a lens system does not become large. Accordingly, deterioration in manufacturing suitability is further prevented.

As shown in FIG. 3, the projection lens 15 includes a first lens L1 to a fifth lens L5 that are arranged in order from the side of the image forming panel 14, the light-shielding member 38 as a flare stopper, and a lens tube 40 that holds these lenses and the light-shielding member. The first lens L1 has convex surfaces on both sides, and the second lens L2 has a concave surface facing the screen 20 and a convex surface facing the image forming panel 14. The third lens L3 has convex surfaces on both sides, and the fourth lens L4 has a convex surface facing the screen 20 and a planar surface facing the image forming panel 14. The fifth lens L5 has a convex aspherical surface facing the screen 20 and a planar surface facing the image forming panel 14.

The lens tube 40 includes a cylindrical lens-tube main body 41, a first lens frame 43 to a fifth lens frame 47 that are arranged within the lens-tube main body 41 and hold the first lens L1 to the fifth lens L5, and a cam cylinder 42 that move the second lens L2 to the fourth lens L4 in an optical axis direction. The first lens frame 43 fits onto an end portion of the lens-tube main body 41 facing the image forming panel 14, and is fixed by attachment screws 50. The fifth lens frame 47 fits onto an end portion of the lens-tube main body 41 facing the screen 20, and is fixed by an attachment screw 51.

Figure 5:
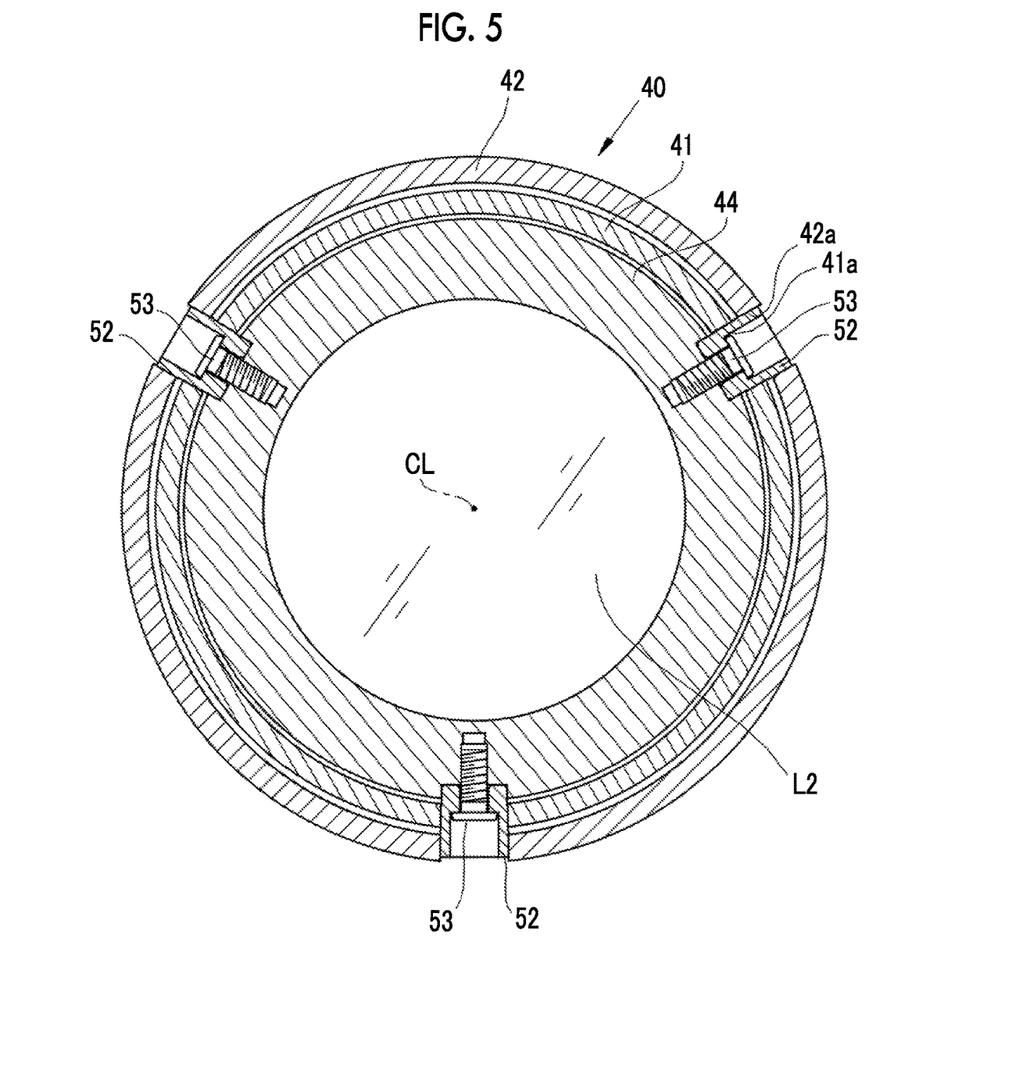
FIG. 5 is a cross-sectional view taken along line V-V of FIG. 3 in order to show an attachment state of a second lens to a lens frame.

The second lens frame 44, the third lens frame 45, and the fourth lens frame 46 are accommodated so as to be freely moved in the direction of the optical axis CL within the lens-tube main body 41. As shown in FIG. 5, cam pins 52 are attached to an outer circumference of the second lens frame 44 to the fourth lens frame 46 by the attachment screws 53. The cam pins 52 are attached at pitches of 120° in an outer circumferential direction of the second lens frame 44 to the fourth lens frame 46. The cam pins 52 protrude outwards from cutoff portions 41a formed on the lens-tube main body 41, and engage with cam grooves 42a of the cam cylinder 42. Thus, the cam cylinder 42 is rotated around the lens-tube main body 41. Accordingly, the second lens frame 44 to the fourth lens frame 46 are set in predetermined positions in the optical axis direction, and thus, focus adjustment is performed. Since the lens-tube main body 41, the cam cylinder 42, and the first lens frame 43 to the fifth lens frame 47 have a complex cross-sectional shape, these members are made from synthetic resin such as polycarbonate. The cam cylinder 42 and the first lens frame 43 to the fifth lens frame 47 may be made from a metal in whole or part.

Figure 6:
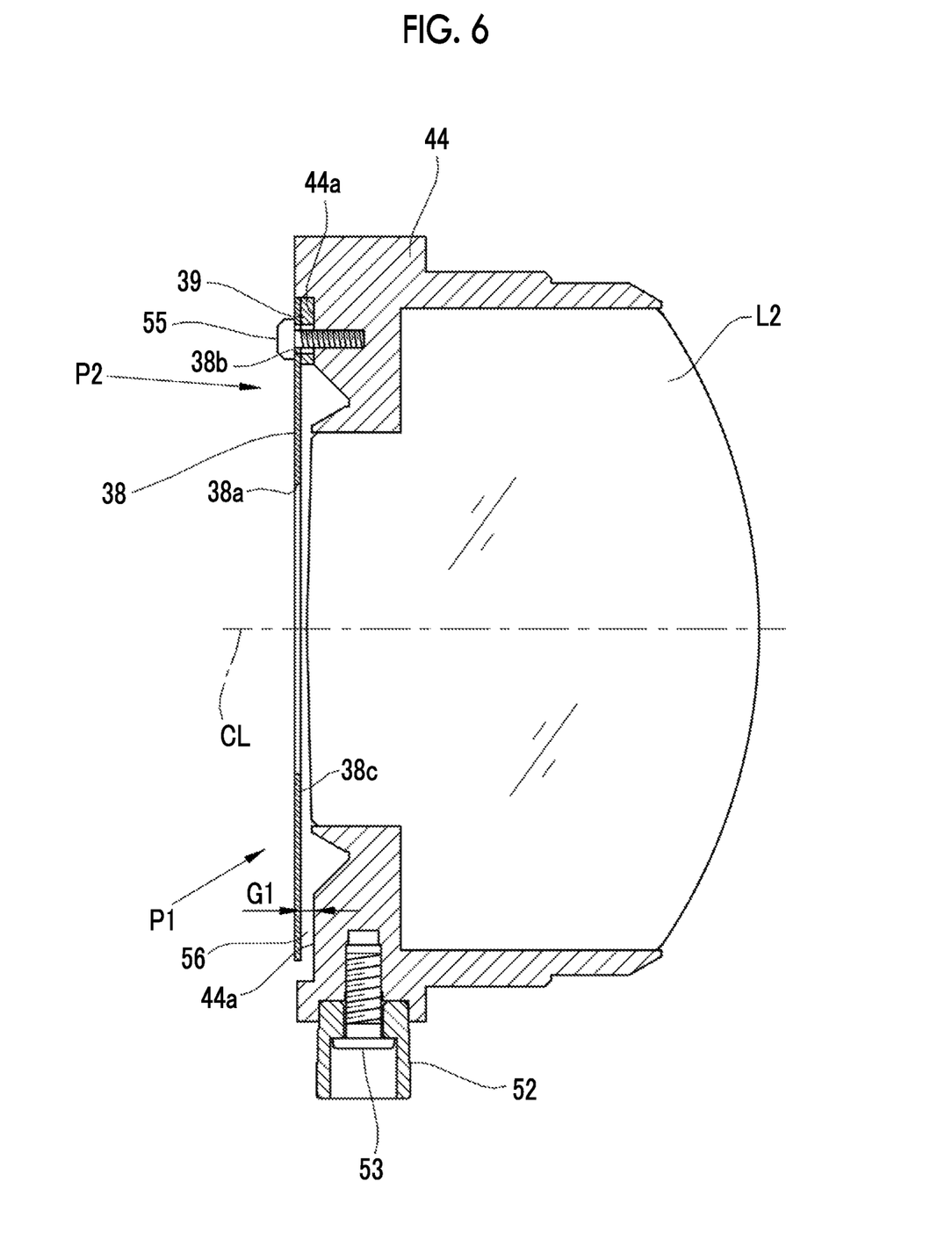
FIG. 6 is a longitudinal cross-sectional view showing an attachment state of a light-shielding member to a second lens frame.
Figure 7:
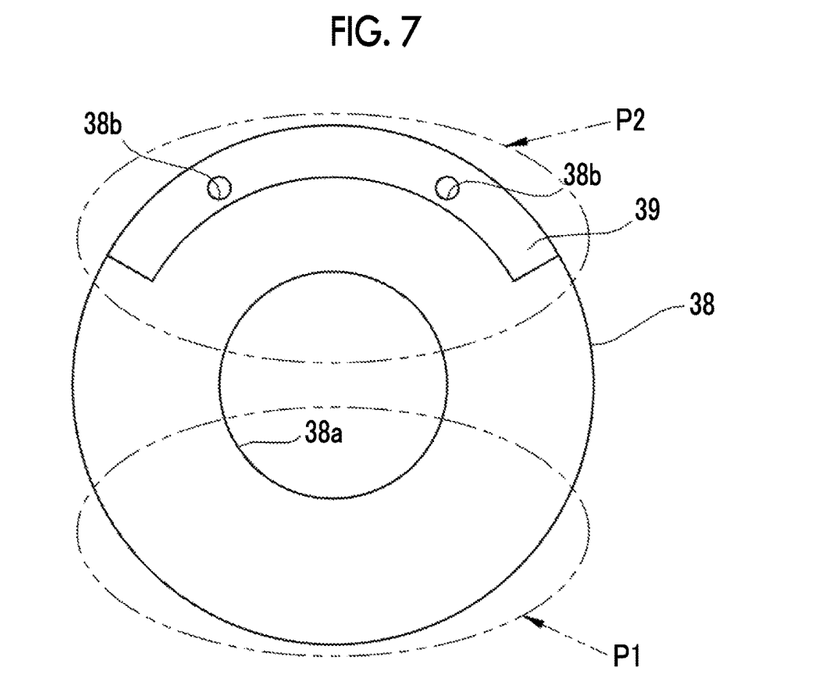
FIG. 7 is a front view in a case where the light-shielding member is viewed from the image forming panel.

As shown in FIGS. 6 and 7, the light-shielding member 38 is a circular thin plate made from any of a metal, ceramic, polyphenylene sulfide (PPS), and high heat-resistance synthetic resin such as polyimide (PI). In the present embodiment, a metal plate is used. A circular opening 38a is formed in a center of the light-shielding member 38. The opening 38a transmits illumination light rays, and unnecessary light rays are cut by an edge portion of the opening. A black layer is formed through coating or plating on a front surface of the light-shielding member 38.

The light-shielding member 38 is fixed to the second lens frame 44 by an attachment screw 55 through a fan-shaped spacer 39. A spacer 39 is made from the same material as that of the light-shielding member 38. An end surface of the second lens frame 44 facing the light-shielding member 38 is a light-shielding-member attachment surface 44a. The light-shielding member 38 is attached to the light-shielding-member attachment surface 44a by the attachment screw 55 through the spacer 39. The attachment screw 55 is inserted through an attachment hole 38b formed in the light-shielding member 38 and the spacer 39, and is screwed to a screw hole of the second lens frame 44.

A position in which the light-shielding member 38 is fixed to the second lens frame 44 by the attachment screw 55 is a second portion P2 opposite to a first portion P1 with the optical axis CL positioned therebetween. The first portion P1 is a portion below the optical axis CL in a case where the lens-tube main body 41 is viewed in the optical axis direction. More specifically, the first portion is within a region range of at least ±5° with a vertical line (reference line) in the shift direction of the image forming panel as its reference (0°), more preferably, within a region range of ±90°. The second portion P2 is a region other than the first portion P1, and is a portion above the optical axis CL. More specifically, the first portion is within a region range of at least 180±90° with the shift direction of the image forming panel as its reference (0°), more preferably, within a region range of 180±45°.

The spacer 39 forms a gap 56 having a length G1 in the optical axis direction between the light-shielding member 38 and the light-shielding-member attachment surface 44a of the second lens frame 44 in the first portion P1, and holds the gap 56. Thus, the spacer 39 has the same thickness as the length G1 of the gap 56. Due to the gap 56, heat caused by the unnecessary light rays applied to the light-shielding member 38 is not transferred to the light-shielding-member attachment surface 44a of the second lens frame 44 from the first portion P1 of the light-shielding member 38. The length G1 of the gap 56 may be a length with which heat generated by a temperature rise caused by the unnecessary light rays of the light-shielding member 38 are not transferred to the second lens frame 44 through air, and may be, for example, 0.2 mm or more.

As shown in FIG. 3, since the image forming panel 14 is fixed in the position which is shifted downwards from the optical axis CL of the projection lens 15 in the direction perpendicular to the optical axis CL, light rays incident on the projection lens 15 mainly pass through the portion below the optical axis CL of the projection lens 15. Passing paths of the light rays are reversed in a position of a stop. The light rays mainly pass through the upper portion of the projection lens 15, and are projected onto the screen 20. The schematic passing paths of the light rays that pass through the positions of the image forming panel 14 within the projection lens 15 are depicted by solid lines, and the centers of the light rays are depicted by dashed double-dotted lines.

Since the light rays are close to the image forming panel 14 on the periphery of the light-shielding member 38, the light rays incident on the projection lens 15 mainly pass through the portion below the optical axis CL of the projection lens 15, and thus, the lower portion of the light-shielding member 38 is mainly heated by the unnecessary light rays reaching the light-shielding member 38. Since the light-shielding member 38 is fixed over the entire circumference of the lens frames or the lens-tube main body in the related art, a temperature distribution is generated in the shift direction of the image forming panel in the projection lens 15. In a case where a temperature difference due to the temperature distribution becomes large, the temperature distribution is transferred to the second lens frame 44 or the lens-tube main body 41 that holds the light-shielding member from the light-shielding member 38. Accordingly, only the first portion P1 of the lens-tube main body 41 to which the image forming panel 14 is shifted is heated, and thus, the lens-tube main body 41 is deformed. The lenses L1 to L5 tilt due to the deformation, and the resolution of the entire image projected onto the screen 20 is deteriorated. Thus, the quality of the image quality is degraded. The lenses L1 to L5 tilt, and thus, the rotation symmetry of the lenses L1 to L5 is broken. As a result, a focus position is shifted in a diagonal direction due to the occurrence of field curvature, and thus, the performance of the entire projection image is deteriorated. In the present embodiment, since the light-shielding member 38 is fixed to the second lens frame 44 in the second portion P2, the heat caused by the unnecessary light rays is distributed from the first portion P1 to the second portion P2 within the light-shielding member 38. Since the heat of the light-shielding member 38 is transferred to the second lens frame 44 in the second portion P2 in which a temperature rise is less, it is possible to decrease the temperature difference in the shift direction of the image forming panel within the projection lens 15. Therefore, a local temperature rise is suppressed, and the deformation of the lens-tube main body 41 is suppressed.

Second Embodiment

Figure 8:
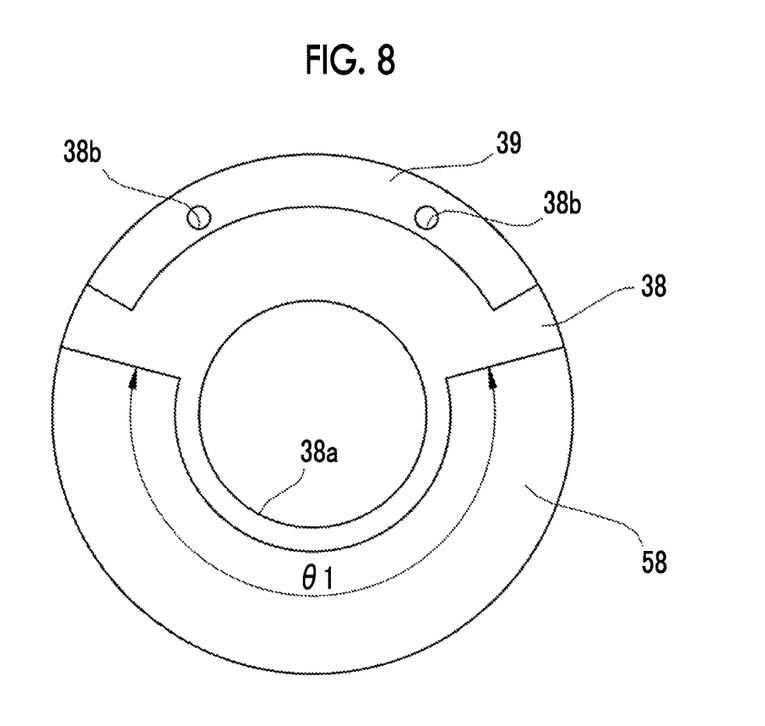
FIG. 8 is a front view in a case where a light-shielding member according to a second embodiment is viewed from the image forming panel.

In a second embodiment shown in FIG. 8, a fan-shaped insulation member 58 is disposed in the gap 56 (see FIG. 6) of the first portion P1 of the first embodiment. For example, the insulation member 58 is made from an insulation material, and is made from ceramic. The insulation member 58 may have thermal conductivity lower than that of the lens tube 40. A fan-shaped aperture angle θ1 of the insulation member 58 is, for example, 150°. A thickness of the insulation member 58 is equal to or less than a thickness of the spacer 39. The insulation member 58 is attached to the light-shielding member 38 by a heat-resistance adhesive. In the following embodiments, the same constituent members will be assigned the same references, and thus, the redundant description thereof will be omitted.

In the second embodiment, since the insulation member 58 is disposed in the gap 56, the heat transfer from the light-shielding member 38 to the second lens frame 44 can be suppressed by the insulation member 58. The heat of the first portion P1 of which the temperature is high is distributed to the second portion P2, and then, the heat may be released to the second lens frame 44 through the attachment screw 55 and the spacer 39.

Third Embodiment

Figure 9:
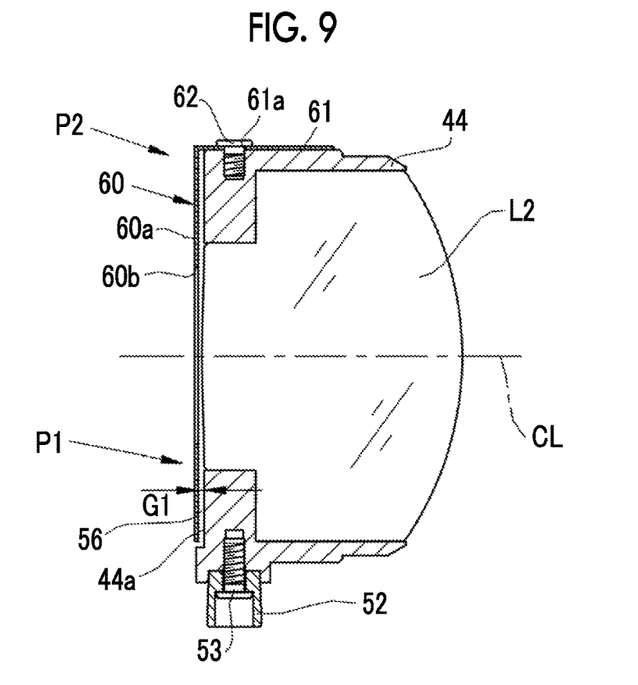
FIG. 9 is a longitudinal cross-sectional view showing an attachment state of a light-shielding member according to a third embodiment.
Figure 10:
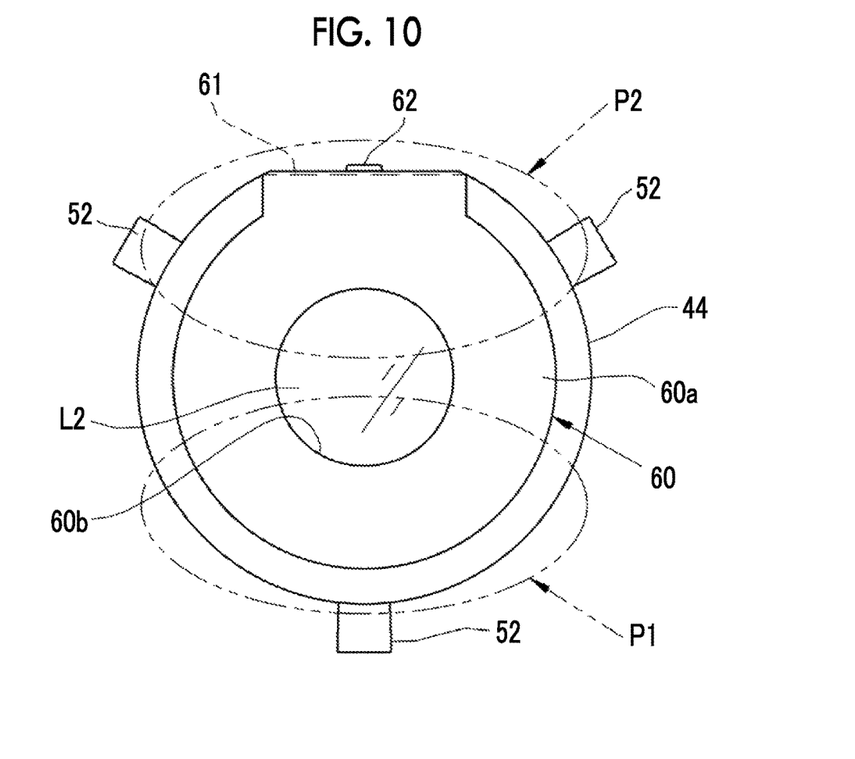
FIG. 10 is a front view in a case where the light-shielding member according to the third embodiment is viewed from a screen.

In a third embodiment shown in FIGS. 9 and 10, a light-shielding member 60 is fixed to the second lens frame 44 through an attachment piece 61 instead of fixing the light-shielding member 38 to the second lens frame 44 through the spacer 39. The light-shielding member 60 includes a light-shielding main body 60a and the attachment piece 61. The light-shielding main body 60a is a circular plate having a circular opening 60b in the center. The attachment piece 61 extends from an upper edge portion of the light-shielding main body 60a, and is bent from the light-shielding main body 60a by 90°.

An attachment hole 61a is formed in the attachment piece 61. An attachment screw 62 is inserted through the attachment hole 61a, and the attachment screw 62 is screwed to a screw hole of the second lens frame 44. In a case where the attachment screw is screwed to the screw hole of the second lens frame, the gap 56 having the length G1 is formed between the light-shielding member 60 and the light-shielding-member attachment surface 44a of the second lens frame 44, as in the first embodiment. Accordingly, thermal conduction between the light-shielding member 60 and the light-shielding-member attachment surface 44a of the second lens frame 44 in the first portion P1 is suppressed, and the amount of heat caused by the unnecessary light rays in the first portion P1 is distributed through the second portion P2. Since the heat of the first portion P1 is transferred to the second lens frame 44 through the attachment piece 61 and the attachment screw 62 of the light-shielding member 60, the local temperature rise is suppressed, and the deformation of the lens-tube main body 41 is suppressed. As in the second embodiment, the insulation member 58 may be inserted into the gap 56 in the third embodiment.

Modification Example

Figure 11:
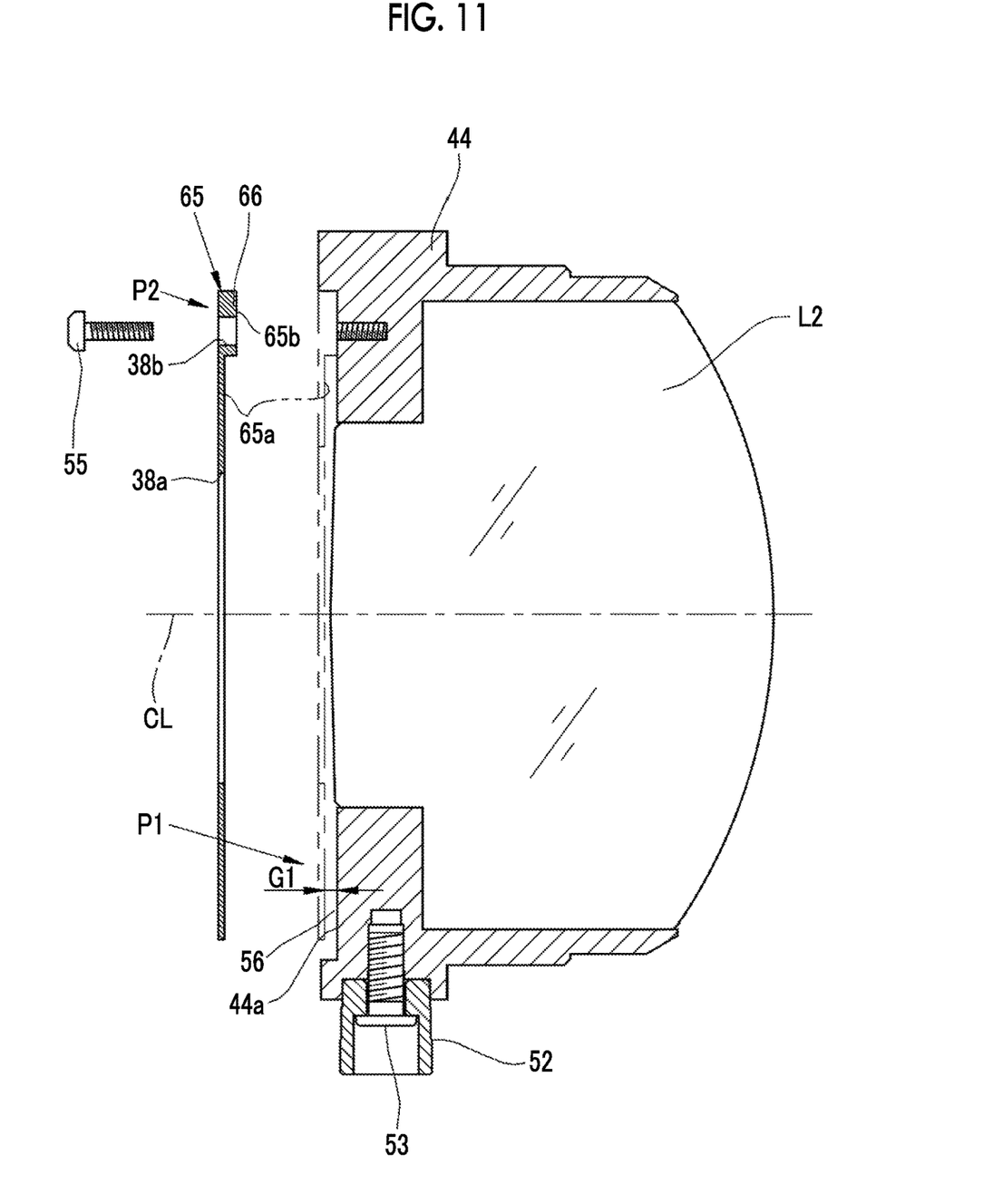
FIG. 11 is a longitudinal cross-sectional view showing a modification example of the light-shielding member in which a spacer is integrally formed.
Figure 12:
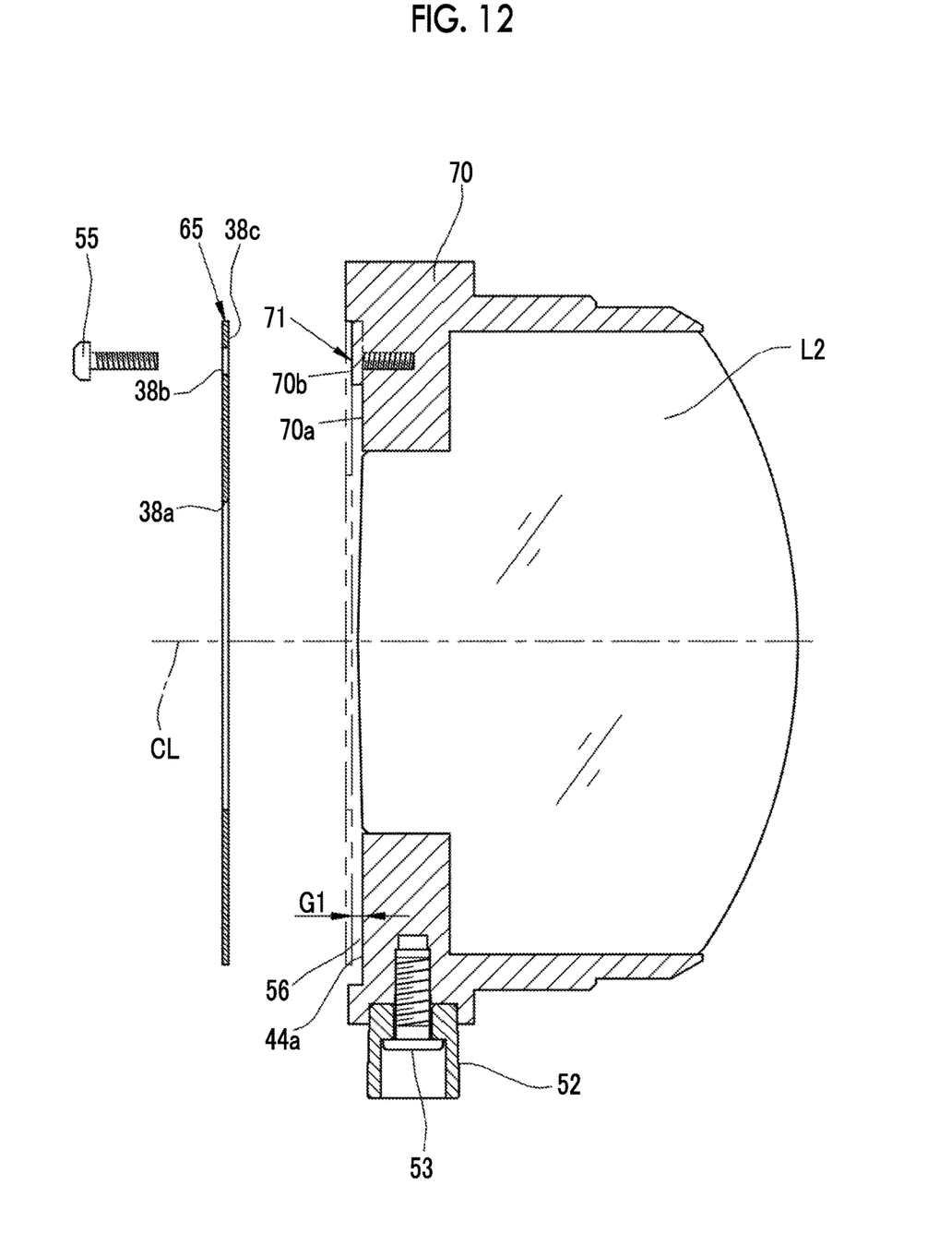
FIG. 12 is a longitudinal cross-sectional view showing a modification example in which the spacer is integrally formed in the second lens frame.

Although it has been described in the first embodiment and the second embodiment that the spacer 39 is formed separately from the light-shielding member 38, a spacer 66 may be integrally formed in a light-shielding member 65, and the light-shielding member 65 may be attached to the second lens frame 44, as shown in FIG. 11. The spacer 66 is integrally formed in the light-shielding member 65, and thus, a lens-tube attachment surface 65a of the light-shielding member 65 partially protrudes in the optical axis direction, and severs as a bearing surface 65b. The light-shielding member 65 is attached to the second lens frame 44 through the bearing surface 65b. As shown in FIG. 12, a spacer 71 may be integrally formed in a second lens frame 70 instead of forming the spacer 66 in the light-shielding member 65. In this case, a light-shielding-member attachment surface 70a of the second lens frame 70 partially protrudes in the optical axis direction due to the spacer 71, and serves as a bearing surface 70b. A lens-tube attachment surface 38c of the light-shielding member 65 is closely attached to the bearing surface 70b, and the light-shielding member 65 is attached to the second lens frame 70. As shown in FIG. 11, the first portion P1 of the light-shielding member 65 may be formed so as to be thinner than the second portion P2 instead of integrally forming the spacer 66 in the light-shielding member 65 so as to protrude. Due to a thickness difference, the gap 56 is formed between the light-shielding member 65 and the light-shielding-member attachment surface 44a of the second lens frame 44.

Although it has been described in the embodiments that the light-shielding member 38, 60, or 65 is disposed in the second lens frame 44, the light-shielding member 38, 60, or 65 may be formed at another lens frame. Although it has been described that the light-shielding member 38, 60, or 65 is disposed near the light-shielding-member attachment surface 44a of the second lens frame 44, the light-shielding member 38, 60, or 65 may be disposed near an end surface of the second lens frame 44 facing the image forming panel. The light-shielding member 38, 60, or 65 is not limited to be formed on one lens frame, and may be formed on a plurality of lens frames.

Fourth Embodiment

Figure 13:
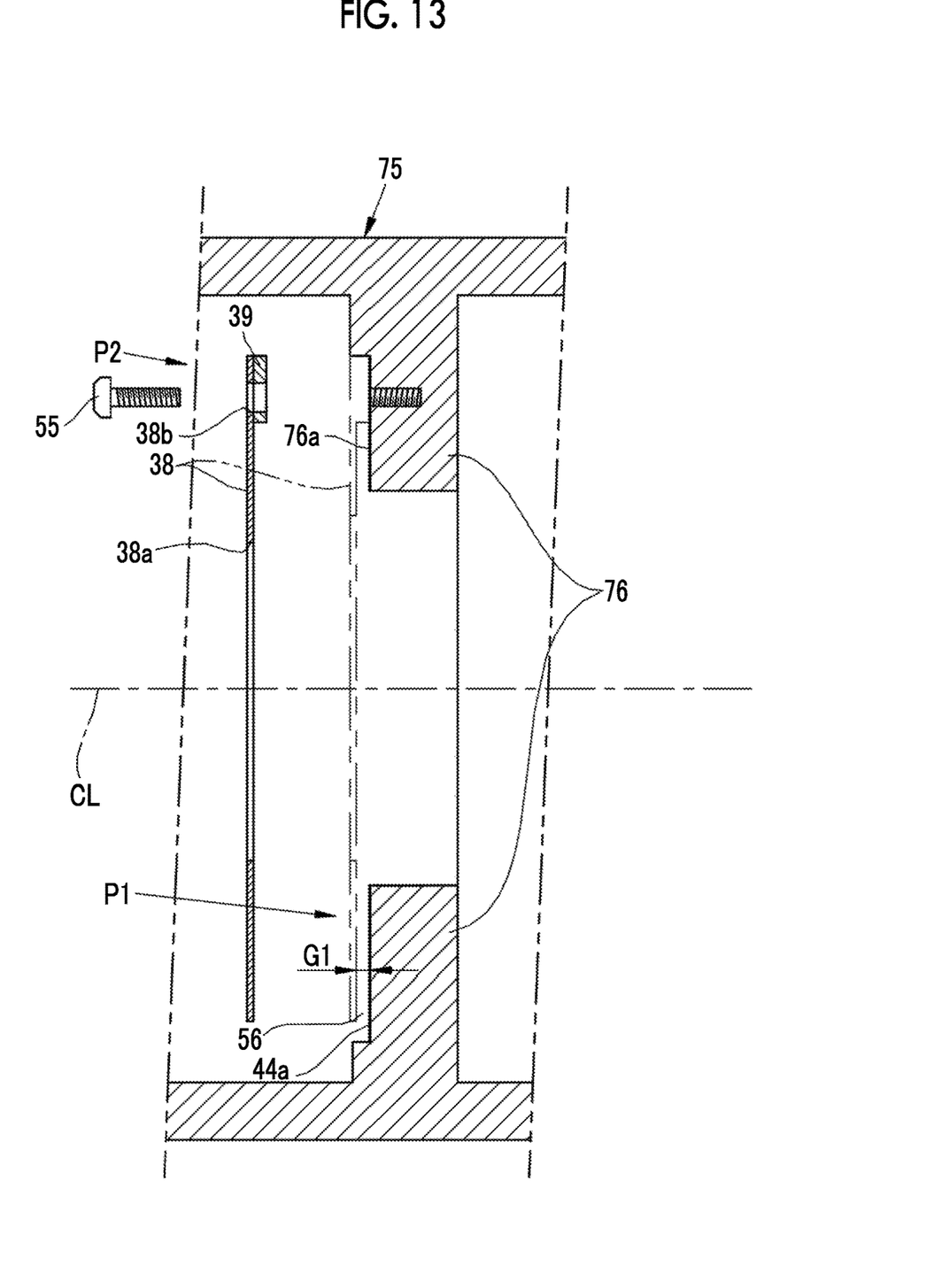
FIG. 13 is a longitudinal cross-sectional view showing a fourth embodiment in which the light-shielding member is attached to a protrusion edge portion formed at a lens-tube main body.

It has been described in the embodiments that the light-shielding member 38, 60, or 65 is attached to the second lens frame 44. In a fourth embodiment shown in FIG. 13, a protrusion edge portion 76 is formed on an inner circumferential surface of a lens-tube main body 75, and the same light-shielding member 38 as that of the first embodiment is attached to the protrusion edge portion 76. The protrusion edge portion 76 is formed inside the lens-tube main body 75 in an annular ring shape in an inner circumferential direction, and protrudes inwards. An end surface of the protrusion edge portion 76 facing the light-shielding member serves as a light-shielding-member attachment surface 76a. The light-shielding member 38 is attached to the light-shielding-member attachment surface 76a through the spacer 39.

Fifth Embodiment

Figure 14:
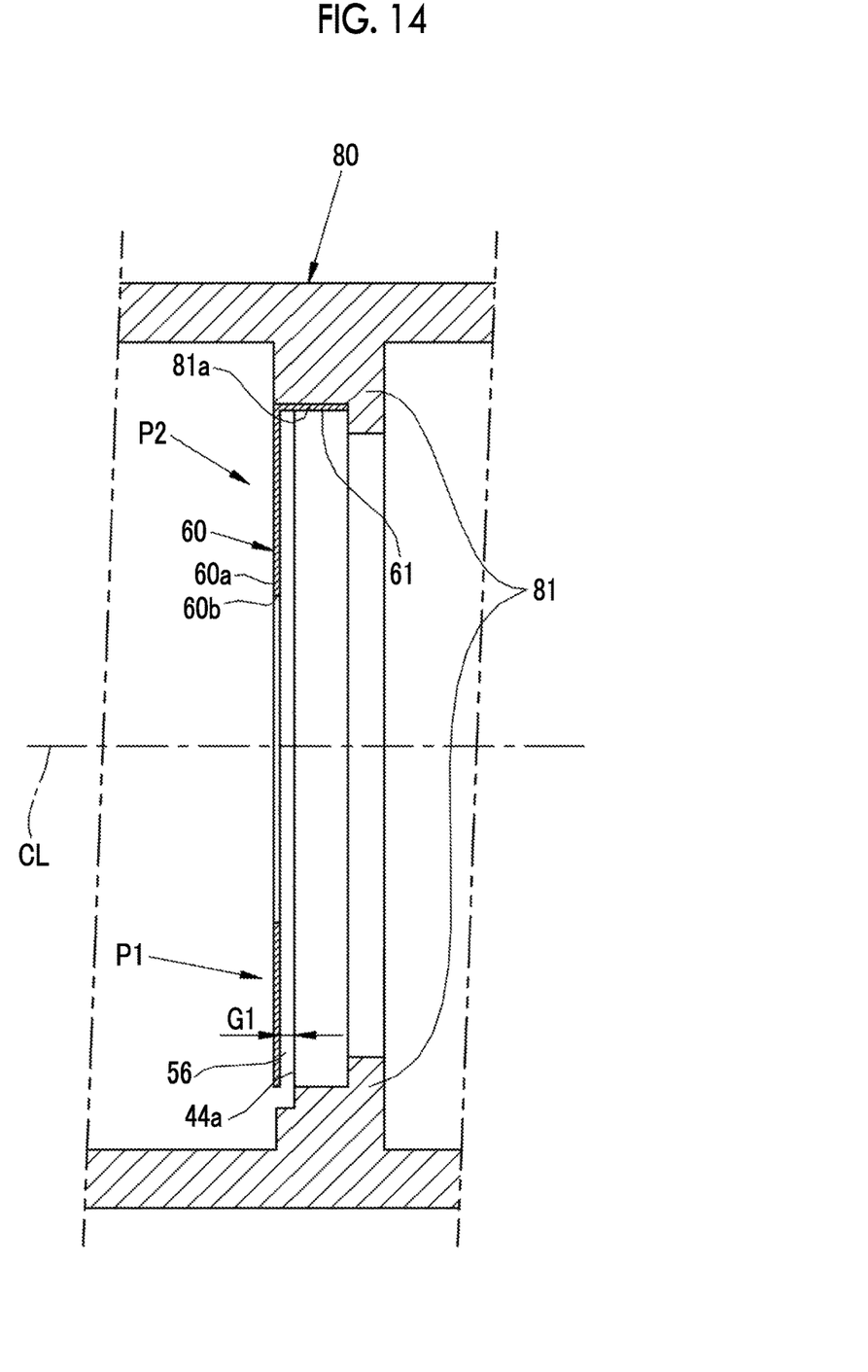
FIG. 14 is a longitudinal cross-sectional view showing a fifth embodiment in which the light-shielding member is attached to the protrusion edge portion formed at the lens-tube main body by an attachment piece.

In a fifth embodiment shown in FIG. 14, a protrusion edge portion 81 is formed on an inner circumferential surface of the lens-tube main body 80, and the same light-shielding member 60 as that of the third embodiment is attached to the protrusion edge portion 81. The protrusion edge portion 81 is formed inside the lens-tube main body 80 in an annular ring shape in an inner circumferential direction, and protrudes inwards. An inner circumferential surface of the protrusion edge portion 81 serves as an attachment surface 81a of the attachment piece 61 of the light-shielding member 60. The light-shielding member 60 is attached to the attachment surface 81a through the attachment piece 61. In the fourth embodiment and the fifth embodiment, the light-shielding member 38 or 60 may be directly attached to the lens-tube main body 75 or 80 without using the lens frame.

Although it has been described in the embodiments that the transmissive type liquid crystal panel is used as the image forming panel 14, a reflective type liquid crystal panel may be used. In this case, the light source 13 is disposed so as to face a front surface of the image forming panel 14, and simultaneously emits irradiation light rays of three RGB colors. In a case where DMD is used as the image forming panel 14, the light source 13 is disposed so as to face the front surface of the image forming panel 14, and the light source emits the LEDs 31R, 31G, and 31B of the three RGB colors in a time-division manner in synchronization with a timing when a three-color image of the DMD is formed.

Although it has been described in the embodiments that the projector 10 is disposed on a table, the present invention may also be applied to a case where the projector is hung from the ceiling. Although it has been described that the image is projected onto the screen 20, the projection surface is not limited to the screen 20, and a projector that projects an image on various projection surfaces may be used.

EXPLANATION OF REFERENCES

10: projector
11: case
13: light source
14: image forming panel
14a: image forming surface
15: projection lens
17: control unit
20: screen
21: zoom dial
22: light amount adjustment dial
23: focus dial
24: vertical pin adjustment dial
25: horizontal pin adjustment dial
26: screen correction dial
31B, 31G, 31R: LED
32, 33: dichroic mirror
38: light-shielding member
38a: opening
38b: attachment hole
38c: lens-tube attachment surface
39: spacer
40: lens tube
41: lens-tube main body
41a: cutoff portion
42: cam cylinder
42a: cam groove
43: first lens frame
44: second lens frame 44a: light-shielding-member attachment surface
45: third lens frame
46: fourth lens frame
47: fifth lens frame
50, 51: attachment screw
52: cam pin
53, 55: attachment screw
56: gap
58: insulation member
60: light-shielding member
60a: light-shielding main body
60b: circular opening
61: attachment piece
61a: attachment hole
62: attachment screw
65: light-shielding member
65a: lens-tube attachment surface
65b: bearing surface
66: spacer
70: second lens frame
70a: light-shielding-member attachment surface
70b: bearing surface
71: spacer
75: lens-tube main body
76: protrusion edge portion
76a: light-shielding-member attachment surface
80: lens-tube main body
81: protrusion edge portion
81a: attachment surface
CL: optical axis
L1: first lens
L2: second lens
L3: third lens
L4: fourth lens
L5: fifth lens
P1: first portion
P2: second portion
S: shift ratio
θ1: aperture angle

What is claimed is:

1. A projector comprising:
a projection lens that includes a lens and a lens tube which holds the lens;
an image forming panel that forms an image, and is disposed such that a center of the image forming panel is shifted from an optical axis of the projection lens;
a light source that irradiates the image forming panel with light, and projects the image on a projection surface with the projection lens; and
a light-shielding member that has an opening through which the optical axis passes, cuts light unnecessary in the projection in an edge portion of the opening, and is attached so as to be fixed to the lens tube in a second portion opposite to a first portion to which the image forming panel is shifted from the optical axis with the optical axis positioned therebetween and so as to hold a gap between the lens tube and the light-shielding member in the first portion,
wherein the lens tube has a light-shielding-member attachment surface perpendicular to the optical axis,
the light-shielding member has a lens-tube attachment surface to be attached to the light-shielding-member attachment surface, and
the light-shielding member is attached to the lens tube between the light-shielding-member attachment surface and the lens-tube attachment surface through a spacer having a thickness in a direction of the optical axis.

2. The projector according to claim 1,
wherein the lens tube includes a cylindrical lens-tube main body, and a lens frame that is disposed within the lens-tube main body and holds the lens, and the light-shielding-member attachment surface is an end surface of the lens frame facing the light-shielding member.

3. The projector according to claim 1,
wherein the lens tube includes a cylindrical lens-tube main body, and a protrusion edge portion that protrudes inwards from an inner circumferential surface of the lens-tube main body, and the light-shielding-member attachment surface is an end surface of the protrusion edge portion facing the light-shielding member.

4. The projector according to claim 1, further comprising:
an insulation member that is disposed in the gap.

5. A projector comprising:
a projection lens that includes a lens and a lens tube which holds the lens;
an image forming panel that forms an image, and is disposed such that a center of the image forming panel is shifted from an optical axis of the projection lens;
a light source that irradiates the image forming panel with light, and projects the image on a projection surface with the projection lens; and
a light-shielding member that has an opening through which the optical axis passes, cuts light unnecessary in the projection in an edge portion of the opening, and is attached so as to be fixed to the lens tube in a second portion opposite to a first portion to which the image forming panel is shifted from the optical axis with the optical axis positioned therebetween and so as to hold a gap between the lens tube and the light-shielding member in the first portion,
wherein the lens tube has a light-shielding-member attachment surface perpendicular to the optical axis,
the light-shielding member has a lens-tube attachment surface to be attached to the light-shielding-member attachment surface, and
at least one of the light-shielding-member attachment surface or the lens-tube attachment surface includes a spacer that protrudes in a direction of the optical axis, and the light-shielding member is attached to the lens tube through the spacer.

6. The projector according to claim 5,
wherein the lens tube includes a cylindrical lens-tube main body, and a lens frame that is disposed within the lens-tube main body and holds the lens, and the light-shielding-member attachment surface is an end surface of the lens frame facing the light-shielding member.

7. The projector according to claim 5,
wherein the lens tube includes a cylindrical lens-tube main body, and a protrusion edge portion that protrudes inwards from an inner circumferential surface of the lens-tube main body, and the light-shielding-member attachment surface is an end surface of the protrusion edge portion facing the light-shielding member.

8. A projector comprising:
a projection lens that includes a lens and a lens tube which holds the lens;
an image forming panel that forms an image, and is disposed such that a center of the image forming panel is shifted from an optical axis of the projection lens;

a light source that irradiates the image forming panel with light, and projects the image on a projection surface with the projection lens; and a light-shielding member that has an opening through which the optical axis passes, cuts light unnecessary in the projection in an edge portion of the opening, and is attached so as to be fixed to the lens tube in a second portion opposite to a first portion to which the image forming panel is shifted from the optical axis with the optical axis positioned therebetween and so as to hold a gap between the lens tube and the light-shielding member in the first portion, wherein the light-shielding member includes an attachment piece that extends in a direction of the optical axis from an edge of the light-shielding member, and a gap is formed in the optical axis direction between the light-shielding member and the lens tube through the attachment piece.

9. The projector according to claim 8, wherein the lens tube includes a cylindrical lens-tube main body, and a lens frame that is disposed within the lens-tube main body and holds the lens, and the light-shielding-member attachment surface is an end surface of the lens frame facing the light-shielding member.

10. The projector according to claim 8, wherein the lens tube includes a cylindrical lens-tube main body, and a protrusion edge portion that protrudes inwards from an inner circumferential surface of the lens-tube main body, and the light-shielding-member attachment surface is an end surface of the protrusion edge portion facing the light-shielding member.

11. A projector comprising:

a projection lens that includes a lens and a lens tube which holds the lens;

an image forming panel that forms an image, and is disposed such that a center of the image forming panel is shifted from an optical axis of the projection lens;

a light source that irradiates the image forming panel with light, and projects the image on a projection surface with the projection lens; and a light-shielding member that has an opening through which the optical axis passes, cuts light unnecessary in the projection in an edge portion of the opening, and is attached so as to be fixed to the lens tube in a second portion opposite to a first portion to which the image forming panel is shifted from the optical axis with the optical axis positioned therebetween and so as to hold a gap between the lens tube and the light-shielding member in the first portion, wherein the second portion is in a region range of 180±90° with a shift direction of the image forming panel as a reference line in a state in which the lens tube is viewed in a direction of the optical axis.

12. The projector according to claim 11, wherein the lens tube includes a cylindrical lens-tube main body, and a lens frame that is disposed within the lens-tube main body and holds the lens, and the light-shielding-member attachment surface is an end surface of the lens frame facing the light-shielding member.

13. The projector according to claim 11, wherein the lens tube includes a cylindrical lens-tube main body, and a protrusion edge portion that protrudes inwards from an inner circumferential surface of the lens-tube main body, and the light-shielding-member attachment surface is an end surface of the protrusion edge portion facing the light-shielding member.

14. A projector comprising:

a projection lens that includes a lens and a lens tube which holds the lens;

an image forming panel that forms an image, and is disposed such that a center of the image forming panel is shifted from an optical axis of the projection lens;

a light source that irradiates the image forming panel with light, and projects the image on a projection surface with the projection lens; and a light-shielding member that has an opening through which the optical axis passes, cuts light unnecessary in the projection in an edge portion of the opening, and is attached so as to be fixed to the lens tube in a second portion opposite to a first portion to which the image forming panel is shifted from the optical axis with the optical axis positioned therebetween and so as to hold a gap between the lens tube and the light-shielding member in the first portion, wherein, in a case where a distance from the optical axis to a center of the image forming panel is Y, a length of the image forming panel in a shift direction of the image forming panel is H, and a shift ratio of the image forming panel acquired by dividing the distance Y by the length H is $S=Y/H$, the shift ratio S is in a range of $0.4<S<0.7$.

15. The projector according to claim 14, wherein the lens tube includes a cylindrical lens-tube main body, and a lens frame that is disposed within the lens-tube main body and holds the lens, and the light-shielding-member attachment surface is an end surface of the lens frame facing the light-shielding member.

16. The projector according to claim 14, wherein the lens tube includes a cylindrical lens-tube main body, and a protrusion edge portion that protrudes inwards from an inner circumferential surface of the lens-tube main body, and the light-shielding-member attachment surface is an end surface of the protrusion edge portion facing the light-shielding member.

17. An image deterioration prevention method of a projector in which an image forming panel is disposed such that a center of the image forming panel is shifted from an optical axis of a projection lens, light is emitted from a light source to the image forming panel, and an image of the image forming panel is projected onto a projection surface with the projection lens, the method comprising:

fixing a light-shielding member that is disposed in a lens tube which holds the projection lens, has an opening through which the optical axis passes, and cuts light unnecessary in the projection in an edge portion of the opening in a second portion opposite to a first portion of the lens tube to which the image forming panel is shifted from the optical axis with the optical axis positioned therebetween; and holding a gap in a direction of the optical axis between the light-shielding member and the lens tube in the first portion wherein, in a case where a distance from the optical axis to a center of the image forming panel is Y, a length of the image forming panel in a shift direction of the image forming panel is H, and a shift ratio of the image forming panel acquired by dividing the distance Y by the length H is $S=Y/H$, the shift ratio S is in a range of $0.4<S<0.7$.

* * * * *